United States Patent
Chambers et al.

(10) Patent No.: US 6,587,688 B1
(45) Date of Patent: Jul. 1, 2003

(54) PROVIDING TELEPHONE NUMBER DATA FOR INTERNATIONAL CELLULAR ROAMER SERVICE

(75) Inventors: Michael Dwayne Chambers, Plainfield, IL (US); Chee Keong Lee, Hilliard, OH (US); Tony Tuong Nguyen, Aurora, IL (US); Charles C. Teising, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/561,623

(22) Filed: May 2, 2000

Related U.S. Application Data
(60) Provisional application No. 60/169,785, filed on Dec. 9, 1999.

(51) Int. Cl.$^7$ ................................................ H04Q 7/20
(52) U.S. Cl. ...................................... 455/433; 455/432
(58) Field of Search ................................. 455/403, 410, 455/414, 422, 432, 433, 445, 455, 461, 552, 560; 370/401, 466, 467; 379/219, 229, 230

(56) References Cited

U.S. PATENT DOCUMENTS

| | | | | |
|---|---|---|---|---|
| 5,978,678 A | * | 11/1999 | Houde et al. | 455/433 |
| 6,006,094 A | * | 12/1999 | Lee | 455/445 |
| 6,094,578 A | * | 7/2000 | Purcell et al. | 455/426 |
| 6,259,914 B1 | * | 7/2001 | Koster | 455/432 |

OTHER PUBLICATIONS

TIA, EIA 41D Internationalization: Submission to ANSI–41 (Standards Body). C. Teising. Nov. 19, 1998. (See Especially 6.4.2.31, j & k, p. 22).

* cited by examiner

Primary Examiner—Thanh Cong Le
Assistant Examiner—James Ewart

(57) ABSTRACT

Apparatus and a method for providing international numbers in order to implement international cellular roamer service. When a roamer registers, the Visitor Location Register (VLR) serving the roamer, queries the Home Location Register (HLR) record of the roamer. The HLR tests whether the VLR is in a foreign country. If so, the HLR provides numerical information, such as the roamer's billing number, in international form, including the country code of the HLR. Advantageously, the VLR is provided with international numbers where appropriate, and the roamer can be accommodated outside the roamer's home country.

18 Claims, 4 Drawing Sheets

PROVIDING TELEPHONE NUMBER DATA FOR INTERNATIONAL CELLULAR ROAMER SERVICE

RELATED APPLICATIONS

This Application claims the priority date of Provisional Application Serial No. 60/169,785, filed on Dec. 9th, 1999, by the inventors of this Application.

TECHNICAL FIELD

This invention relates to apparatus and a method for providing roamer telephone numbers in an international setting.

BACKGROUND OF THE INVENTION

Roamer service is a cellular mobile wireless service that is provided to customers who leave the area served by their home mobile switching center (MSC), and the immediate geographic area served by that MSC and associated MSCs for serving the geographic area. When a mobile station (MS) registers outside its home area, a remote MSC receives the registration request, and requests that a Visitor Location Register (VLR) create a record for the roaming MS. The VLR queries a Home Location Register (HLR) of the roaming MS in order to notify the HLR of the present location of the MS, and to obtain numerical data such as a call forwarding number and a billing number for the roaming MS. Such data is required for serving the roaming MS from the remote MSC, and is stored in the VLR of the remote MSC.

A problem arises when the home MSC and the remote MSC are in different countries. The telephone numbers that are stored in the HLR and VLR are usually national telephone numbers which do not include, for example, a country code. A problem of the prior art is that the use of the normal telephone numbers stored in the HLR would create ambiguities in the VLR, and make international roamer service awkward or impossible.

SOLUTION

The above problem is solved and an advance is made over the teachings of the prior art in accordance with this invention, wherein an HLR in response to receipt of a request for VLR data, tests whether the VLR is in the same country. If not, the HLR prefixes its own country code for numbers stored in the HLR. For call forwarding numbers, such numbers are stored in the HLR, including a country code, if the call forwarding number is outside the country of the HLR. The VLR then stores numbers pertaining to countries outside the VLR's country to include a country code, but continues to store numbers of the country in which the VLR resides in the format of that country. Advantageously, such an arrangement allows for the storage of international numbers where needed, and national numbers where international numbers are not needed, and facilitates the offering of international roamer service.

BRIEF DESCRIPTION OF THE DRAWING(S)

DETAILED DESCRIPTION

Figure 1:
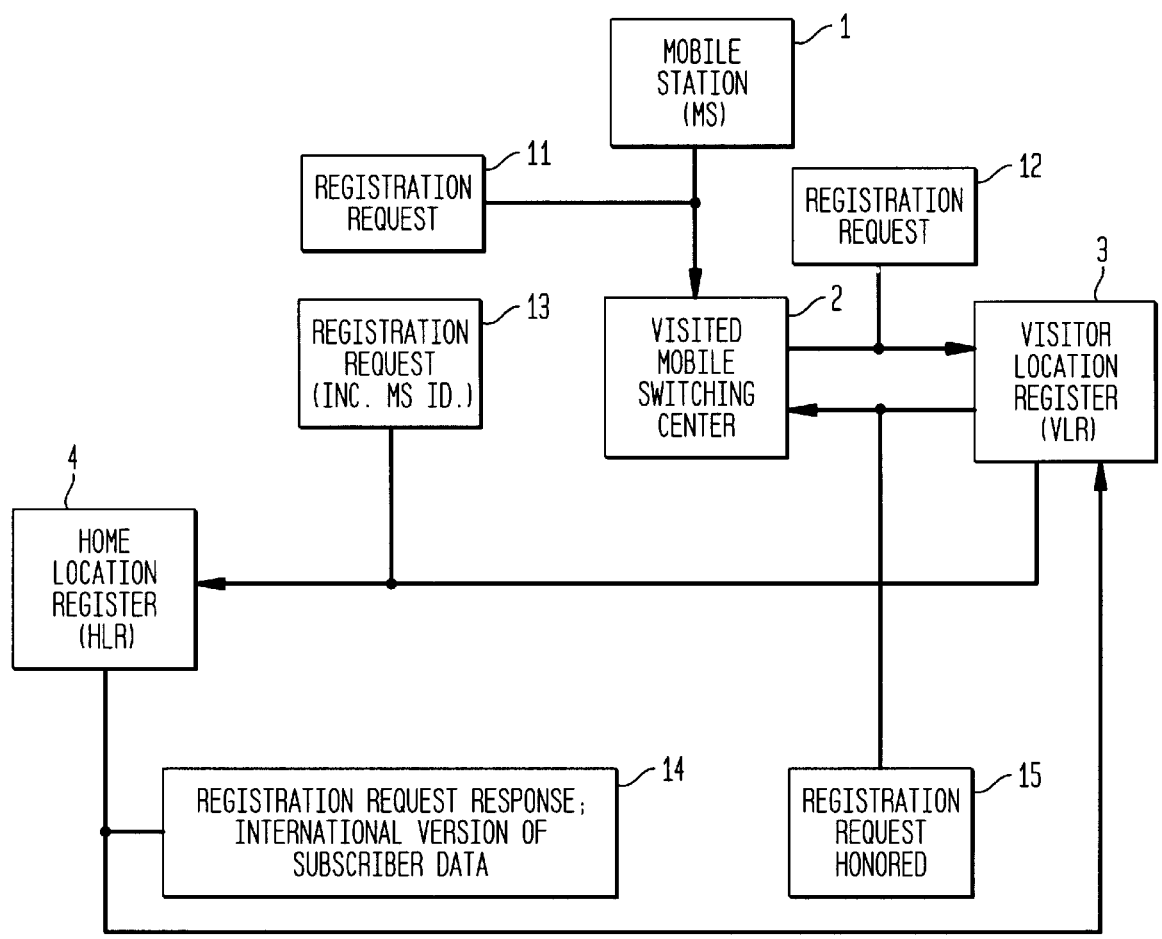
FIG. 1 is a block diagram, illustrating the operation of Applicants' invention.

FIG. 1 illustrates the operation of Applicants' invention. A mobile station 1, having roamer capabilities, is in a foreign country and turns on its power. This leads to a registration request 11, sent by that mobile station to a remote mobile switching center (MSC) 2, located in the foreign country. MSC 2 sends a registration request 12, to a Visitor Location Register (VLR) 3, serving that MSC. The registration request asks the VLR to make a record of the presence of MS 1, so that MS 1 can be served. VLR 3 communicates a registration request 13, to a Home Location Register (HLR) 4, serving MS 1. The HLR 4 tests the registration request 13 to determine whether the registration request is from the same country as the country of the HLR. If it is from the same country, the methods of the prior art are used. If not, the HLR reports back to the VLR, an international version of the subscriber data in a response message 14. The international version includes an international version of any call forwarding number stored in the HLR. VLR 3 records all necessary data from the HLR in the appropriate national or international format, and reports back to MSC 2 in a message 15, that MS 1 is now registered and may be served.

Several ANSI 41 messages includes parameters that contain digits that are used during the processing of calls for roaming mobiles. When a mobile is roaming internationally, these digit parameters must have international significance, (i.e., must contain E.164 country codes), so that they will give the desired result when they are processed by the visited system.

Examples of the ANSI 41 messages and the associated digits parameters that require internationalization include:

| CHAPTER 5. SEC. | MESSAGE | DIGITS PARAMETER |
|---|---|---|
| 6.4.2.13 | Feature Request Return Result | Digits (Dialed) |
| 6.4.2.30 | Origination Request Return Result | Digits (Dialed) |
| 6.4.2.31 | Qualification Directive Invoke | Digits(Destination) DMH_Billing Digits Mobile Directory Number Restriction Digits |
| 6.4.2.37 | Registration Notification | Digits (Destination) DMH_Billing Digits Mobile Directory Number Restriction Digits |
| 6.4.2.46 | Transfer to Number Request Return Result | Digits (Destination) |

Digit parameter internationalization can be accomplished as follows:

1. When the mobile's home system recognizes that the mobile is roaming internationally, then, as necessary, it internationalizes the digits by prefixing its home country code to the digits before sending the message. (The home country code is the E.164 country code for the country where the system is located.)

For example, if the Digits (Destination) parameter contains a forward-to number, then the home system analyzes the number to determine whether it was entered into its database as a national, or international number. If it was entered as a national number, (which means that calls are to be forwarded within the country where the home system is located), then the home system prefixes its home country code to the forward-to number contained in the Digits (Destination) parameter. If the forward-to number was entered as an international number (i.e., with a country code), then the home system does not modify the number before populating it into the Digits (Destination) parameter. Similar processing is done to internationalize other digits parameters that contain numbers that are used to route calls, and to restrict calls from being placed to certain numbers, and for other digits parameters that contain a billing number of the mobile's directory number.

If the digits were previously entered into the home system's database as an international number, then the home system does not modify the number before populating it into the digits parameter.

2. When the mobile's serving system receives from the home system, one of these messages containing an internationalized digits parameter, then, it compares its home country code with that contained in the received parameter. If they differ, then the serving system processes and uses the number in an international context. For example, if the country code of the forward-to number contained in the Digits (Destination) parameter differs from that of the serving system, then the call is forwarded to that international destination. If the home country code of the serving system is the same as the country code of the forward-to number received in the Digits (Destination) parameter, then, the serving system deletes the country code from the parameter and processes and uses the number in a national context. For example, if the country code of the forward-to number is the same as that of the serving system, then the call is forwarded within the country where the serving system is located.

Completion of terminating calls to a roamer who has registered in a foreign country is carried out in the following way. When a call for an international roamer comes into the home system, the HLR sends a route request to the visited system. The visited MSC, (such as MSC 2, in which the roamer has registered), assigns a temporary local directory number (TLDN), to the roamer. This TLDN is forwarded to the VLR. The VLR recognizes that the HLR is in a foreign country and adds the country code for that country to the TLDN. The VLR then forwards the international TLDN to the HLR and thence to the home MSC. The call is then routed, using the international TLDN, to the roamer. The visited system prepares billing records for any roamer calls.

The HLR determines that the VLR is located in a different country by comparing the Mobile Country Code (MCC) of the VLR with the HLR's list of home country MCCs. An internationalized identification number, called an E.212 number, consists of a three digit MCC and a National Mobile Station Identity (NMSI). Each MCC code is uniquely assigned to one country. The E.212 is a non-dialable number used to identify units of the mobile network, such as VLRs, HLRs, switches, cell sites, etc.; or used to identify mobile stations (in which role, it is also called an IMSI (International Mobile Station Identity)). The number that is dialed to place a call to a mobile station is a conventional E.164 number consisting of a country code and a nation specific number.

Figure 2:
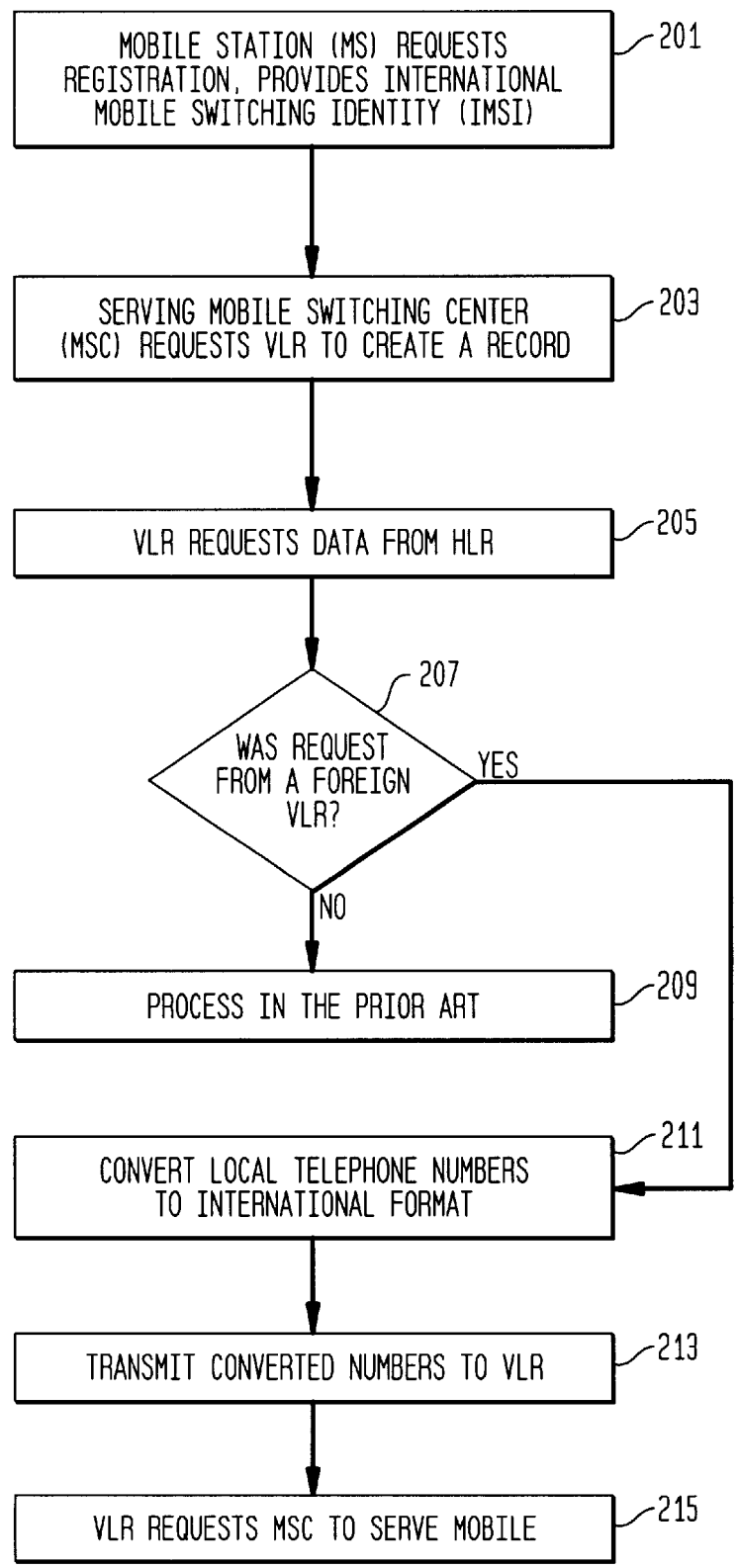
FIG. 2 is a flow diagram illustrating the operation of Applicants' invention.

FIG. 2 is a flow diagram illustrating the operation of Applicants' invention. A mobile station requests registration, and in doing so, provides its international mobile station identifier (IMSI), or some other mobile station identity, (Action Block 201). The serving mobile switching center (MSC), (i.e., the MSC serving the mobile station at the time of the request for registration), requests its associated VLR to create a record for that mobile station, (Action Block 203). The VLR requests data from the HLR of that mobile station, (Action Block 205). Next, it is determined whether the request was from a foreign VLR, (Test 207). If not, then the registration is processed as in the prior art, (Action Block 209). If the request was from a foreign VLR, the national telephone numbers stored in the HLR are converted to an international format by prefixing the country code of that HLR, (Action Block 211). The converted numbers are then transmitted to the VLR, (Action Block 213). The VLR requests the serving MSC to serve said mobile, (Action Block 215), by placing that mobile's identification in its list of served mobiles.

Figure 3:
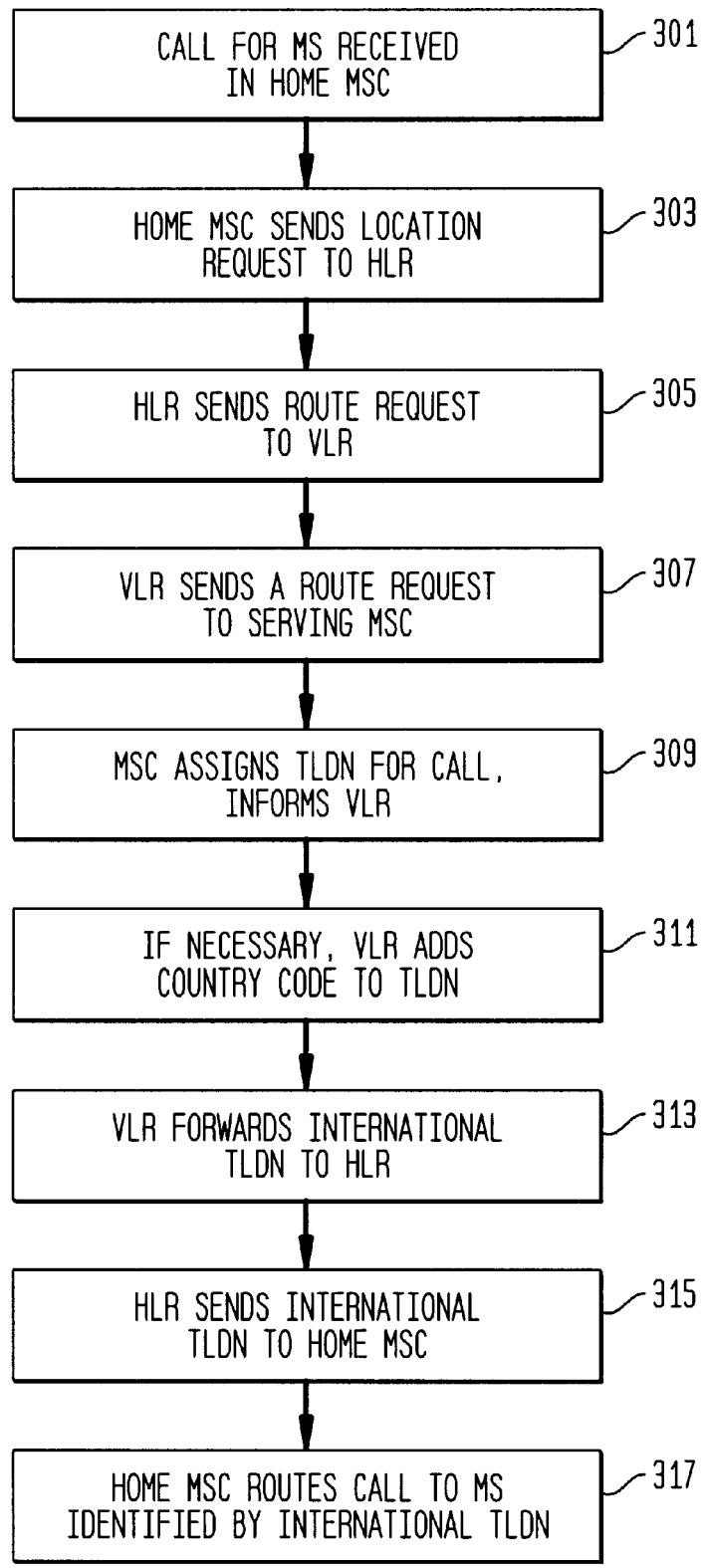
FIG. 3 is a flow diagram illustrating operations executed for calls to the roamer.

FIG. 3 illustrates operations for serving a call terminating to the roamer. When a call is received for the roamer, the call is originally routed to the home MSC, (Action Block 301, FIG. 3). The home MSC sends a location request to the HLR, (Action block 303). The HLR sends a route request to the VLR, (Action Block 305). The VLR sends a route request to the serving (visited) MSC, (Action Block 307). The MSC assigns a TLDN for the call, and informs the VLR, (Action Block 309). The VLR tests if the HLR is located in a different country, and if so, adds the country code to the TLDN, (Action Block 311). The VLR then forwards the international TLDN to the HLR, (Action Block 313). The HLR forwards the international TLDN to the home MSC, (Action Block 315). The home MSC then routes the call to the destination specified by the international TLDN, (Action Block 317).

Figure 4:
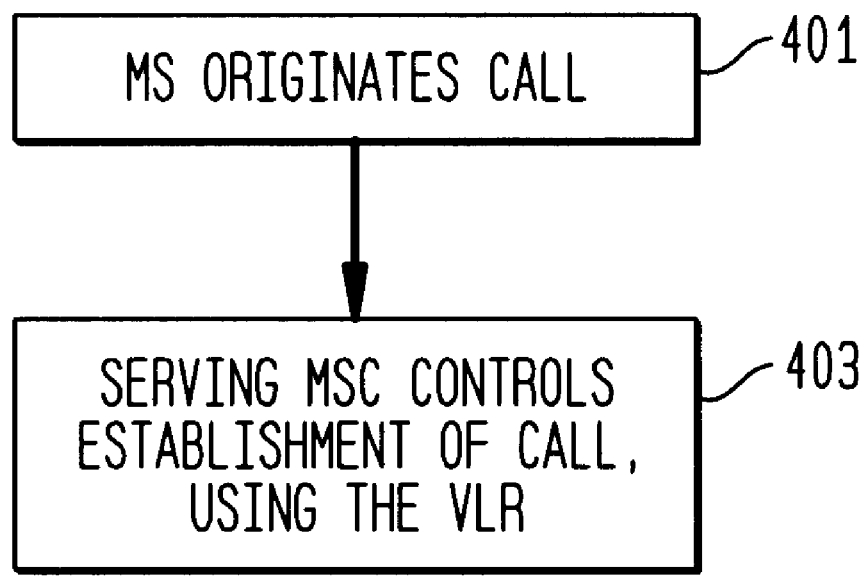
FIG. 4 illustrates operations performed when the roamer originates a call.

FIG. 4 illustrates operations for serving a call originated by the roamer. At some time after registration, the mobile station may originate a call, (Action Block 401). The serving MSC controls establishment of calls from that mobile using the records stored in the VLR, (Action Block 403).

Among the services provided for some mobile users, is restricted dialing privileges. For example, the user may not be allowed to dial certain office codes, (usually within his country), or certain country codes. These restrictions move with a roaming mobile user. For this case, the HLR prefixes its country code to the restricted in-country office codes and sends this information to the VLR. A foreign VLR inspects the internationalized restriction data and deletes the country code if it is the same as that of the VLR.

Another service provided from some mobile users is "hot line" service. The user presses one or two buttons, and this is interpreted as a request to be connected to a specific destination number. Hot-line numbers stored in the VLR are edited to delete country codes from those numbers whose country code matches that of the VLR.

For calling number display, when the HLR requests a TLDN from the serving MSC, the HLR forwards the calling party's number in an internationalized form if the VLR is in a different country. The VLR deletes the country code if the calling party's country code is the same as that of the VLR. This is useful if someone in the VLR's country is calling the roamer. Advantageously, this allows the roamer to dial the displayed number to reach the caller.

The above is a description of one preferred embodiment of Applicants' invention. Other embodiments will be apparent to those of ordinary skill in the art, without departing from the scope of the invention. The invention is only limited by the attached Claims.

What is claimed is:

1. For an international roaming mobile call from a mobile station, a method of providing to a serving mobile switching center (MSC), an appropriate telephone number for processing said call, comprising the steps of:
- a mobile station (MS) requesting registration and providing its identification to said serving MSC;
- said serving MSC requesting an associated Visitor Location Register (VLR) to create a record for said MS;
- said VLR requesting data from a Home Location Register (HLR) serving the identified MS;
- said HLR determining that the request was generated by a VLR of another country;
- said HLR converting telephone numbers of an HLR record for said MS into a form acceptable to said VLR;
- said HLR transmitting in a Mobile Application Part of a signaling message a record comprising the converted telephone numbers to said VLR; and
- said VLR requesting said serving MSC to serve said mobile;
- said mobile station originating a call; and
- said MSC serving said mobile station to control establishment of said call using information stored in said VLR and said HLR.

2. The method of claim 1, wherein the step of converting comprises the step of prefixing a country code of said HLR to telephone numbers stored in nationally significant public telephone numbers in said HLR record, to create a fully qualified international public telephone number.

3. The method of claim 1, wherein the step of serving said mobile station to control establishment of said call comprises the step of converting one of the received converted fully qualified international public telephone number from said VLR.

4. The method of claim 3, wherein said VLR converts one of said received converted fully qualified international public numbers by deleting a country code from a converted number whose country code matches the country code of the VLR.

5. The method of claim 1, wherein the step of determining that the request was generated by a VLR of another country, comprises the steps of:
- extracting a wireless international number of said VLR from the request message received from said VLR;
- identifying a mobile country code of said wireless international number;
- comparing said mobile country code with a list of mobile country codes of said HLR; and
- if said mobile country code is not on said list, determining that the request was generated by a VLR of another country.

6. The method of claim 5, wherein said VLR converts received fully qualified international public hot line numbers by deleting prefixes when the prefixes to be deleted match the country code of the VLR.

7. The method of claim 5, wherein said VLR converts received fully qualified nationally significant public restricted dialing numbers by deleting country code prefixes when the prefixes to be deleted match the country code of the VLR.

8. The method of claim 1, wherein the step of controlling establishment of said call comprises the step of using one of said converted fully qualified international public telephone numbers for a billing record for said call.

9. The method of claim 1, wherein said VLR converts received fully qualified international public calling number display data by deleting a calling number country code if that code matches a country code of the VLR.

10. For an international roaming mobile call from a mobile station, apparatus for providing to a serving mobile switching center (MSC), an appropriate telephone number for processing said call, comprising:
- means for receiving from a mobile station (MS) a registration request providing its identification to said serving MSC;
- said serving MSC comprising means for requesting an associated Visitor Location Register (VLR) to create a record for said MS;
- said VLR comprising means for requesting data from a Home Location Register (HLR) serving the identified MS;
- said HLR comprising means for determining that the request was generated by a VLR of another country;
- said HLR comprising means for converting telephone numbers of an HLR record for said MS into a form acceptable to said VLR;
- said HLR comprising means for transmitting in a Mobile Application Part of a signaling message a record comprising the converted telephone numbers to said VLR; and
- said VLR comprising means for requesting said MSC to serve said mobile;
- responsive to said mobile station originating a call;
- said MSC serving said mobile station to control establishment of said call using information stored in said VLR and said HLR.

11. The apparatus of claim 10, wherein the means for converting comprises means for prefixing a country code of said HLR to telephone numbers stored in international public telephone numbers in said HLR record, to create a fully qualified nationally significant public telephone number.

12. The apparatus of claim 10, wherein the means serving said mobile station to control establishment of said call comprises means for converting one of the received converted fully qualified international public telephone number from said VLR.

13. The apparatus of claim 12, wherein said VLR converts one of said received converted fully qualified international public numbers by deleting a country code from a converted number whose country code matches the country code of the VLR.

14. The apparatus of claim 10, wherein the means for determining that the request was generated by a VLR of another country, comprises means for:
- extracting a wireless international number of said VLR from the request message received from said VLR;
- identifying a mobile country code of said wireless international number;
- comparing said mobile country code with a list of mobile country codes of said HLR; and
- if said mobile country code is not on said list, determining that the request was generated by a VLR of another country.

15. The apparatus of claim 14, wherein said VLR comprises means for converting received fully qualified international public hot line numbers by deleting country code prefixes when the prefixes to be deleted match the country code of the VLR.

16. The apparatus of claim 14, wherein said VLR comprises means for converting received fully qualified international public restricted dialing numbers by deleting country code prefixes when the prefixes to be deleted match the country code of the VLR.

17. The apparatus of claim 10, wherein the means for controlling establishment of said call comprises means for using one of said converted fully qualified international public telephone numbers for a billing record for said call.

18. The apparatus of claim 10, wherein said VLR converts received fully qualified international public calling number display data by deleting a calling number country code if that code matches a country code of the VLR.

* * * * *